United States Patent [19]
Tanishiki

[11] Patent Number: 5,846,000
[45] Date of Patent: Dec. 8, 1998

[54] ROLLER BEARING AND ASSEMBLING METHOD FOR ROLLER BEARING

[75] Inventor: Katsuji Tanishiki, Kashiwara, Japan

[73] Assignee: Koyo Machine Industries Company Limited, Osaka, Japan

[21] Appl. No.: 943,906

[22] Filed: Oct. 3, 1997

[30] Foreign Application Priority Data

Dec. 19, 1996 [JP] Japan ................................ 8-354947

[51] Int. Cl.$^6$ .............................. F16C 19/00; F16H 37/00
[52] U.S. Cl. ................................. 384/618; 74/86
[58] Field of Search .................... 384/445, 590, 384/618, 619, 620; 74/86; 418/55.1, 55.3

[56] References Cited

U.S. PATENT DOCUMENTS

| | | | |
|---|---|---|---|
| 419,035 | 1/1890 | Coxe et al. | 74/86 |
| 419,037 | 1/1890 | Coxe | 74/86 |
| 419,089 | 1/1890 | Wagner | 74/86 |
| 4,259,043 | 3/1981 | Hidden et al. | 418/55.3 |
| 4,715,733 | 12/1987 | Rood | 384/445 |
| 5,542,829 | 8/1996 | Inagaki et al. | 418/55.3 |

*Primary Examiner*—Thomas R. Hannon
*Attorney, Agent, or Firm*—Nikaido, Marmelstein, Murray & Oram LLP

[57] ABSTRACT

A roller bearing by far less costly and highly accurate compared with conventional products and having double-cone rollers as rolling elements. A plural number of track pockets are provided facing a pair of parallel bearing plates, double-cone rollers are swivelably and rollably held in the opposing pair of track pockets respectively, both the bearing plates are connected and held in a state relatively swivelable by a connecting mechanism.

13 Claims, 9 Drawing Sheets

PRIOR ART

ROLLER BEARING AND ASSEMBLING METHOD FOR ROLLER BEARING

BACKGROUND OF THE INVENTION

1. Field of the Invention

The present invention relates to a roller bearing and an assembling method for roller bearing, more specifically to a structure of roller bearing provided with a plural number of double-cone rollers as rolling elements, suitably used as thrust bearing in thrust force supporting structure in scroll type compressor for example.

2. Description of the Related Art

Scroll type compressor is a kind of rotary compressor, and is characterized in that it is compact, has no valve mechanism and that the compression of fluid is continuous. For that reason, scroll type compressor has less torque fluctuations and vibrations compared with conventional compressors such as reciprocating type, etc. and is capable of high-speed operation. By paying special attention to this feature, development for putting to practical use of scroll type compressor is actively promoted in recent years.

By the way, this kind of compressor is provided with a thrust force supporting structure enabling its scroll driving. This supporting structure constitutes a kind of thrust bearing, and spherical body such as steel ball, etc. is used as rolling element which is a main component member. However, such spherical body, supported by point contact, was inferior in durability and had problem about service life, etc. such as unfit for long period of use under high-speed and high-load conditions.

Figure 8A:
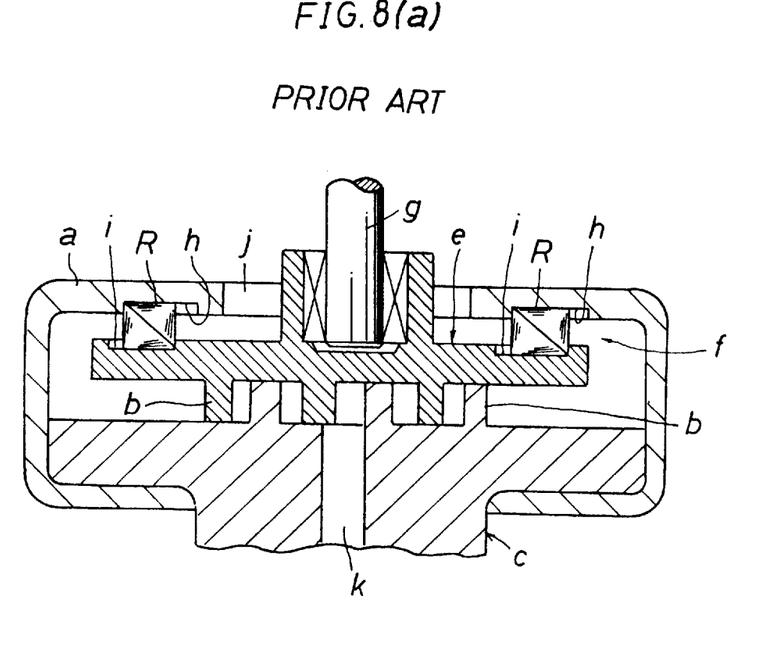

Regarding this point, scroll type compressors are proposed which are provided with a thrust force supporting structure as indicated in FIG. 8 (a) (refer to Japanese Laid-open Utility Model No. 61-82086, Japanese Laid-open Patent No. 62-107284, etc., for example).

The scroll construction of this compressor is realized, as indicated in the drawing, in such a way that a fixed scroll member (c) having a volute body (b) is fixedly provided in a housing (a), and that a swivelling scroll member (e) equipped with a volute body (d) engaged with said volute body (b) is swivelably or revolvably supported by a thrust force supporting structure (f) in the housing (a). And this swivelling scroll member (e) is connected for driving to a driving source outside the illustration, through a crank pin (g).

Said supporting structure (f) takes the form of a kind of thrust bearing as described above. In this supporting structure (f), a plural number of pockets (h), (i) are provided on the inner face of said housing (a) and on the opposite face of said swivelling scroll member (e) in a way to face each other respectively, and between those pockets (h), (i) are rollably inserted rolling elements in the shape of double cone (roller conical on both ends) (R).

And, as said crank pin (g) turns for driving, said swivelling scroll member (e) swivels or revolves without rotating against said fixed scroll member (c). As a result, the fluid gas sucked through the suction port (j) is compressed by the compression chamber formed between the volute bodies (b), (d), and then discharged through the discharge port (k).

Figure 8B:
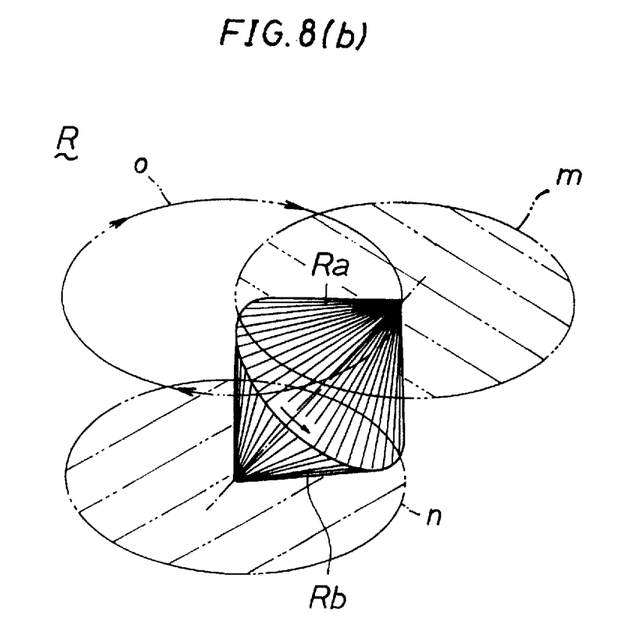

In that case, said double-cone roller (R) caught in said pockets (h), (i) make rolling motion in the state where their conical faces (Ra), (Rb) are in line contact with the flat bottom faces (m), (n) of the pockets (h), (i). Moreover, those double-cone rollers (R), (R), . . . serve to prevent relative rotation of scroll of the two scroll members (c), (e) when said swivelling scroll member (e) swivels against said fixed scroll member (c) (this swivelling route agrees with the route indicated with arrow mark (o) in FIG. 8 (b)).

Moreover, roller bearing suitably used as such thrust force supporting structure (f) is also proposed (refer to Japanese Laid-open Patent No. 62-274113, Japanese Laid-open Patent No. 7-119741, etc., for example).

Figure 9A:
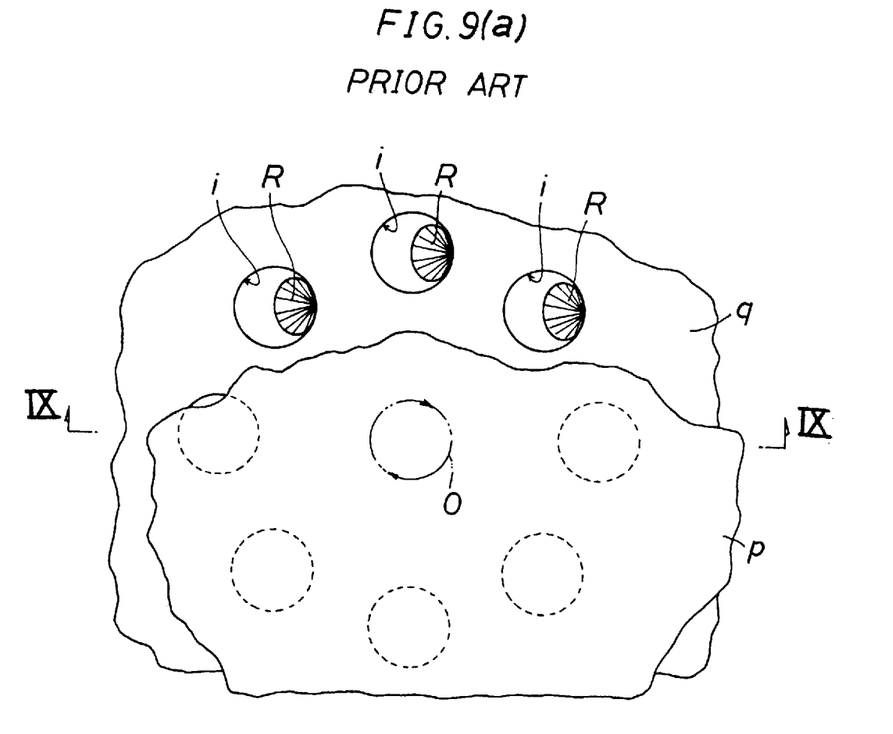
Figure 9B:
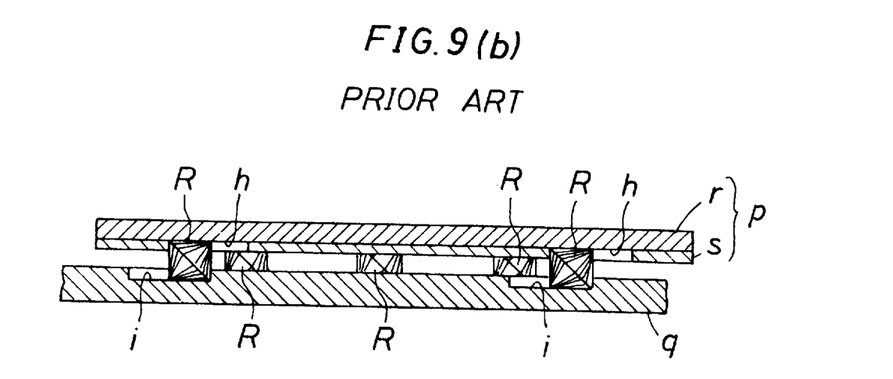

This roller bearing is realized, as shown in FIG. 9 (a) and FIG. 9 (b), with a plural number of double-cone rollers (R), (R), . . . provided rollably between a pair of parallel bearing plates (p), (q). The respective double-cone roller (R) is held in a pair of pockets (h), (i) provided facing said bearing plates (p), (q) respectively. Those pockets (h), (i) are of a circular shape and have an inside diameter corresponding to the relative swivelling route (o) of the two bearing plates (p), (q). The pockets are formed either integrally by lamination and fastening of a track plate (r) having a track forming face and a holding plate (s) having pocket forming holes as pocket (h) of said bearing plate (p), or directly on a single piece of bearing plate (q) as pocket (i) of the bearing plate (q).

And, in said pockets (h), (i), the double-cone roller (R) makes the aforementioned rolling motion as shown in FIG. 8 (b) to guarantee relative and smooth swivelling of the two bearing plates (p), (q) and prevent relative rotation of the two bearing plates (p), (q).

A thrust force supporting structure (f) using such double-cone rollers (R), (R), . . . or roller bearing provides an advantage of greatly improving durability compared with the conventional type of thrust force supporting structure using rolling made of spherical body to be sufficiently resistant to long period of use under high-speed and high-load conditions.

However, in spite of such excellent durability, scroll type compressor provided with said thrust force supporting structure (f), is yet to be put to practical use at present for such reason as non establishment of assembling and manufacturing technologies.

Namely, since the scroll swivelling radius in the scroll construction of said compressor, namely the radius of the swivelling route (o) in said thrust force supporting structure (f) is equal to the length of the bus bar of the conical faces (Ra), (Rb) of said double-cone roller (R), the external dimensions of said double-cone roller (R) itself inevitably become very small from the structural viewpoint. Furthermore, in the thrust force supporting structure (f) of the scroll swivelling unit shown in FIG. 8 (a) and in the construction of the roller bearing shown in FIG. 9 (a) and FIG. 9 (b), high-grade relative dimensional accuracy is requested among the respective component elements and assembling accuracy is also requested. On the other hand, for this kind of thrust force supporting structure (f) or roller bearing, fitness to mass production as mechanical element must also be secured.

However, with structures as described above, even a slight vibration, produced in the assembling process of said scroll structure or in the assembling process of said roller bearing, and further in the incorporating process of said assembled structure or bearing in the scroll structure, disturbs the arrangement and posture of the double-cone rollers (R), (R), . . . For that reason, it is an extremely difficult job to align all the double-cone rollers (R), (R), . . . in one same direction and incorporate them on a track. Moreover, no bearing structure enabling mass production by automatic assembling, etc. has not yet been established at all. As a result, it is practically impossible to mass produce this kind of thrust force supporting structure (f) or roller bearing with high accuracy and at reasonable cost, and they are not yet put to practical use.

BRIEF SUMMARY OF THE INVENTION

The main object of the present invention is to provide a new roller bearing solving such problems of conventional roller bearings.

Another object of the present invention is to provide a roller bearing having double-cone rollers as rolling elements and having a structure which is by far less costly and highly accurate compared with conventional products.

Moreover, still another object of the present invention is to provide a roller bearing which constantly maintains double-cone rollers in a stable state without disturbing their arrangement and posture under any environments due to vibrations, etc.

Furthermore, still another object of the present invention is to provide a roller bearing having excellent durability and sufficiently resistant to long period of use under high-speed and high-load conditions.

Still more, yet another object of the present invention is to provide a roller bearing of unit structure enabling easy and accurate transportation or handling in the state of simple bearing.

Yet more, still another object of the present invention is to provide a roller bearing enabling easy and accurate loading of double-cone rollers in track pockets without disturbing their arrangement and posture nor influenced by the working environments such as production of vibrations, etc., and having a structure which is by far less costly and highly accurate compared with conventional products.

Again, another object of the present invention is to provide a roller bearing enabling easy and accurate assembling in the swivelling unit of equipment and also effectively preventing production of any unusual load without displacement of the two bearing plates during a swivelling operation of the swivelling unit of equipment.

The roller bearing of the present invention comprises a pair of swivelling means which can be assembled to the fixed side part and the swivelling side part of the swivelling unit of equipment respectively, track pockets provided facing the pair of swivelling means respectively, double-cone rollers bearing the thrust load by being swivelably and rollably held in this opposing pair of track pockets and connecting means connecting and maintaining said pair of swivelling means in a relatively swivelable state, whereby said pair of swivelling means are disposed in a state parallel to each other so that they perform relative swivelling motions.

Here, "double-cone roller" means a cone body having a pair of outer circumferential faces in conical shape coaxially connected to each other at the bottom, and this shall remain the same throughout the present specification.

As a preferable mode, said pair of swivelling means consist of a pair of bearing plates in the shape of flat plate assemblable to the fixed side part and the swivelling side part of the swivelling unit of equipment respectively, and the bearing plates are provided respectively with a positioning means to be engaged with the positioning means on either the fixed side or swivelling side of the swivelling unit of equipment in which they are to be incorporated.

In the present invention, double-cone rollers perform rolling motions as shown in FIG. 8 (b) in the track pockets of a pair of swivelling means, to guarantee relative and smooth swivelling of said both swivelling means and prevent relative rotation of the two swivelling means. In this case, since said pair of swivelling means are realized in a unit structure connected and maintained, by connecting means, in a relatively swivelable state, the double-cone rollers held in the track pockets of those two swivelling means are not disturbed in arrangement and posture under any environments due to vibrations, etc. and their state of holding is constantly maintained stable. This enables smooth execution of said rolling motions and facilitates transportation and handling in the form of simple bearings or incorporation in the swivelling unit of equipment.

Moreover, in the state incorporated in said swivelling unit of equipment, one of the pair of bearing plates is fixed on the stationary side and the other is fixed to the swivelling side and, even in the case where the bearing plate on the swivelling side swivels without rotating against the bearing plate on the stationary side according to the swivelling motion of the slewing part of the equipment, said double-cone rollers smoothly and stably perform said rolling motions and said connecting means does not put any obstacle to this swivelling motion.

In the case where said pair of bearing plates are provided respectively with a positioning means (positioning hole, for example) to be engaged with the positioning means (positioning pin, for example) on either the fixed side or swivelling side of the swivelling unit of equipment in which they are to be incorporated, the incorporation in the swivelling unit of equipment becomes easier and more accurate combined with said ease of handling and production of unusual load is prevented effectively without displacement of the two bearing plates during said swivelling motion.

Furthermore, the assembling method of the roller bearing according to the present invention is a method of assembling a roller bearing having said construction, and consists in (1) forming a bearing plate on one side by integrally laminating and fastening a track plate having track forming face and a holding plate having pocket forming hole, (2) provisionally connecting and holding, by connecting means, a holding plate having pocket forming hole in a state relatively swivelable against the bearing plate on one side, (3) positioning them in a state where the pocket forming hole in said bearing plate and the pocket forming hole in said holding plate are mutually eccentric, as seen in plane, by the amount of the radius of swivelling circle of said double-cone rollers, (4) inserting and disposing the respective double-cone rollers, aligned in one same direction, from said holding plate side in a plural number of holding holes in about oval shape formed by lapping of those two inner circumferential faces, (5) forming the other bearing plate by integrally laminating and fastening a track plate having track forming face to this holding plate, and (6) regularly connecting and holding, by the connecting means, this other bearing plate and said bearing plate on one side in a relatively swivelable state.

In the roller bearing assembling method according to the present invention, the double-cone rollers can be loaded in the track pockets easily and accurately without being disturbed in their arrangement and posture nor having any influences on the working environments such as production of vibrations, etc., and are also fit for mass production by automatic assembling equipment, etc.

Said and other related objects and features of the present invention will become clear with reading of detailed explanation based on the attached drawings and their new features pointed out in the claims.

BRIEF DESCRIPTION OF THE DRAWINGS

FIG. 8 (a) is a sectional view showing scroll type compressor which is an object of application of said roller bearing, and indicates a conventional thrust force supporting structure provided with double-cone rollers.

FIG. 8 (b) is a perspective view schematically showing the state of swivelling rolling of said double-cone roller in a scroll type compressor which is an object of application of said roller bearing.

FIG. 9 (a) is a plan view conventional roller bearing also applicable to said roller bearing.

FIG. 9 (b) is a sectional view along the line IX—IX in FIG. 9 (a) also showing said roller bearing.

DETAILED DESCRIPTION OF THE PREFERRED EMBODIMENT

An embodiment of the present invention will be explained hereafter based on drawings.

FIG. 1 to FIG. 7 show a roller bearing according to the present invention and one same symbol indicates one same component member or element throughout the drawings.

The roller bearing according to the present invention is shown in FIG. 1 to FIG. 7. This roller bearing is, to be concrete, a thrust roller bearing suitably used as thrust force supporting structure in scroll type compressor as shown in FIG. 8 (a), for example.

This roller bearing is of unit structure in which a plural number of track pockets 3, 4 are provided facing a pair of parallel bearing plates 1, 2 respectively and that double-cone rollers (R), (R), . . . are swivelably and rollably held in those respective pairs of track pockets 3, 4 opposing each other.

In the illustrated roller bearing, 12 pieces each of track pockets 3, 4 are provided facing a pair of parallel bearing plates 1, 2 respectively, and double-cone rollers (R), (R), . . . are swivelably and rollably held in this opposing pairs of track pockets 3, 4 opposing each other, respectively. Moreover, said bearing plates 1, 2 are connected and held not to be separated from each other by a connecting mechanism 5 as connecting means, and the entire roller bearing is constructed as a unit structure.

Said bearing plates 1, 2 are assembled respectively to the fixed side part and the swivelling side part of the swivelling unit of equipment, to function as swivelling means, and have one same structure. For example, the upper bearing plate 1 has a shape of thin circular flat board realized by laminally and integrally fastening a track plate 6 and a holding plate 7, and its inside diameter is set for a size fit for passing through the shaft part of the scroll swivelling unit in the object scroll type compressor.

Said track plate 6 consists of a circular flat board to be concrete. The inner face 6a of the track plate 6 (see FIG. 6) is realized as a flat track forming face.

Said holding plate 7 consists, to be concrete, of a circular flat board having the same inside and outside diameters as those of said track plate 6. At the central portion in radial direction of the holding plate 7, a plural number of pocket forming holes 7a, 7b, . . . are provided at equal intervals in the circumferential direction to pass through. The illustrated holding plate 7 is provided with 12 pocket forming holes 7a, 7a, . . .

And, as said track plate 6 and said holding plate 7 are integrally laminated and fastened by means of rivets 8, 8, . . . the inner face 6a of the track plate 6 and the pocket forming holes 7a, 7a, . . . of the holding plate 7 form a plural number of track pockets 3 (4), . . . provided at equal intervals in the circumferential direction on the bearing plate 1.

Figure 1:
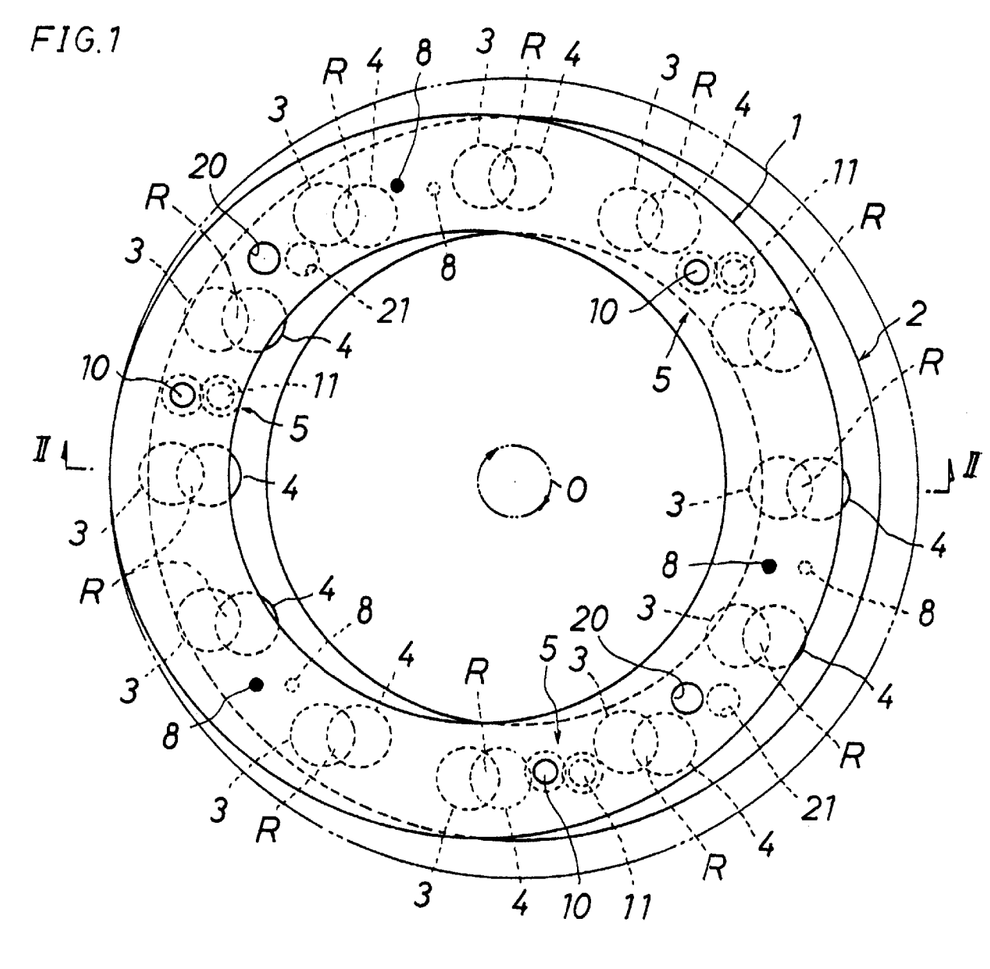
FIG. 1 is a plan view showing the roller bearing which is an embodiment of the present invention.
Figure 2:
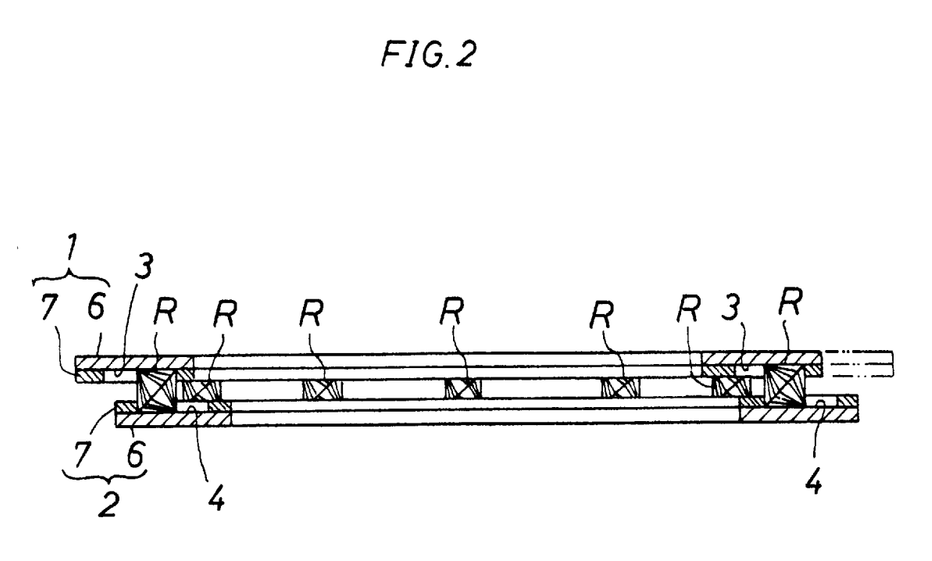
FIG. 2 is a sectional view along the line II—II in FIG. 1 showing said roller bearing.
Figure 3:
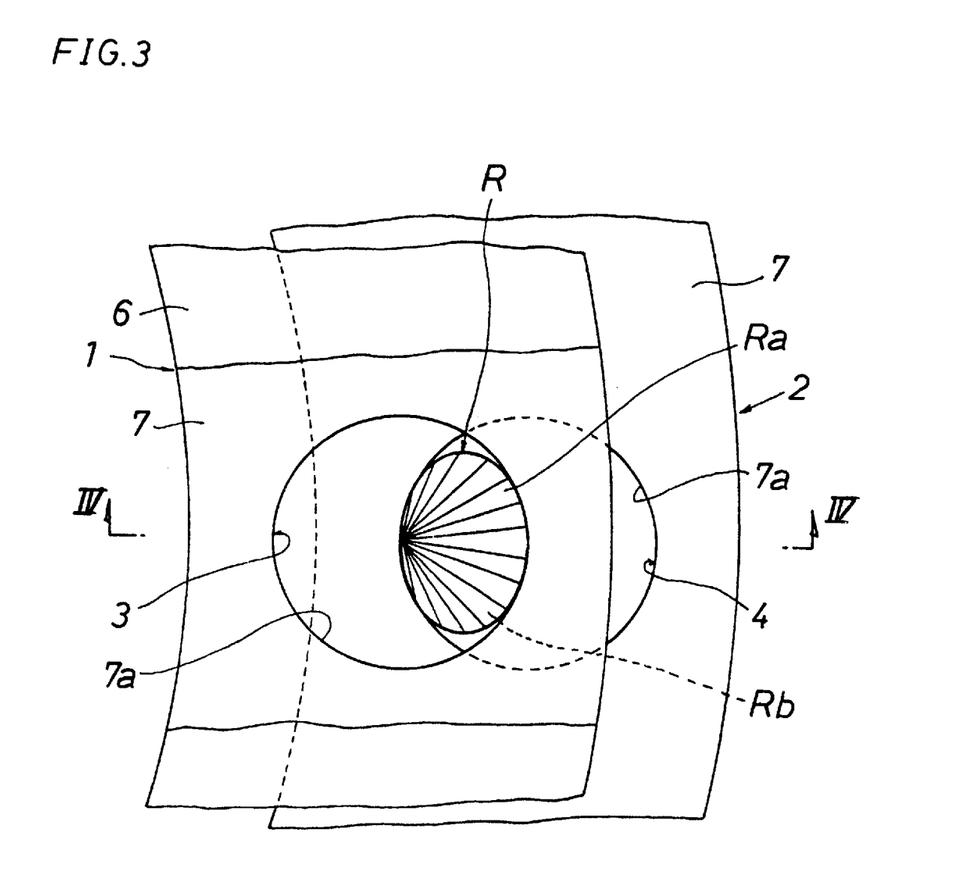
FIG. 3 is an expanded plan view showing, by partial cutting, the holding structure of double-cone rollers which is an essential part of said roller bearing.
Figure 4:
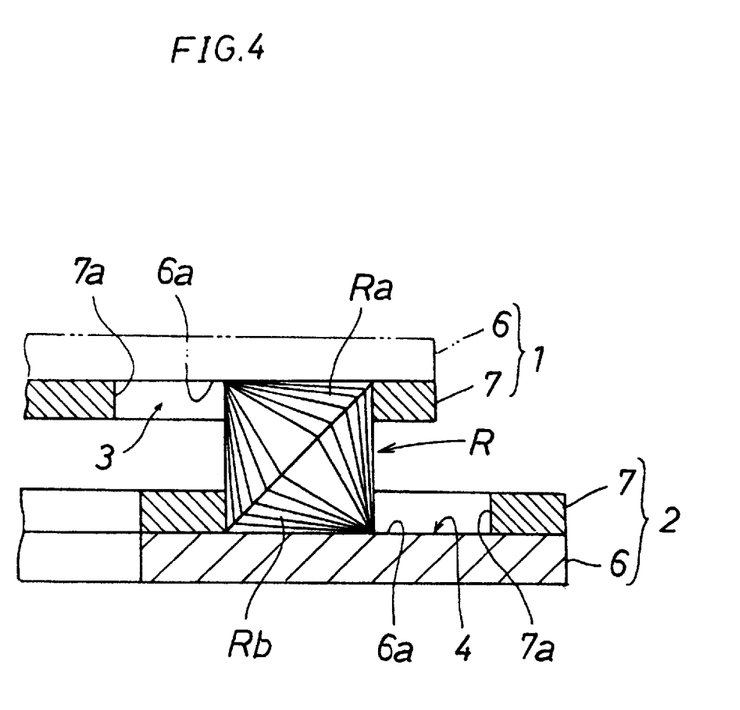
FIG. 4 is a sectional view along the line IV—IV in FIG. 3 showing, by expanding, the holding structure of double-cone rollers which is another essential part of said roller bearing.

The inner circumferential face of said track pockets 3 (4), namely the inner circumferential face of said pocket forming hole 7a have one same diameter as the swivelling circle (see outer circumferential face of faces (m), (n) in FIG. 8 (b)) of the double-cone roller (R). Moreover, in said bearing plates 1, 2, the inner circumferential face of a pair of opposing track pockets 3, 4 is disposed in a state mutually eccentric, as seen in plane, by the amount of the radius of swivelling circle of said double-cone roller (R), as shown in FIG. 1 and FIG. 3. And, in the holding hole of about oval shape formed by lapping those two inner circumferential faces are rollably guided and held said double-cone roller (R) respectively.

Said double-cone roller (R) have double-cone faces (Ra), (Rb) realized as ground and finished rolling faces. The conical face (Ra) on one side is made rollable on the track face i.e. bottom face of the track pocket 3 in the bearing plate 1, while the other conical face (Rb) is made rollable on the track face i.e. bottom face of the track pocket 4 in the bearing plate 2.

Figure 5:
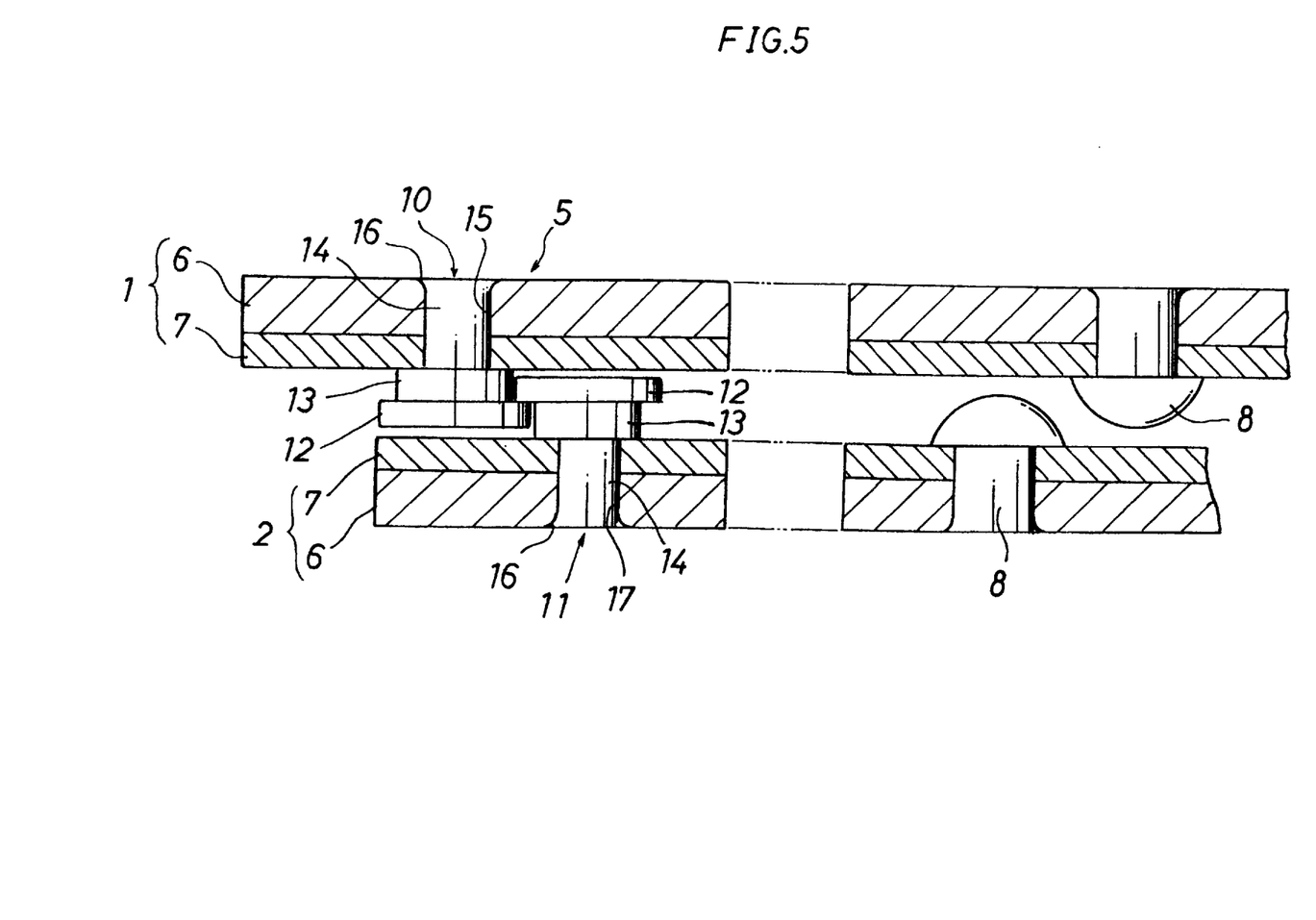
FIG. 5 is a sectional view showing, by expanding, the connecting mechanism which is still another essential part of said roller bearing.
Figure 6:
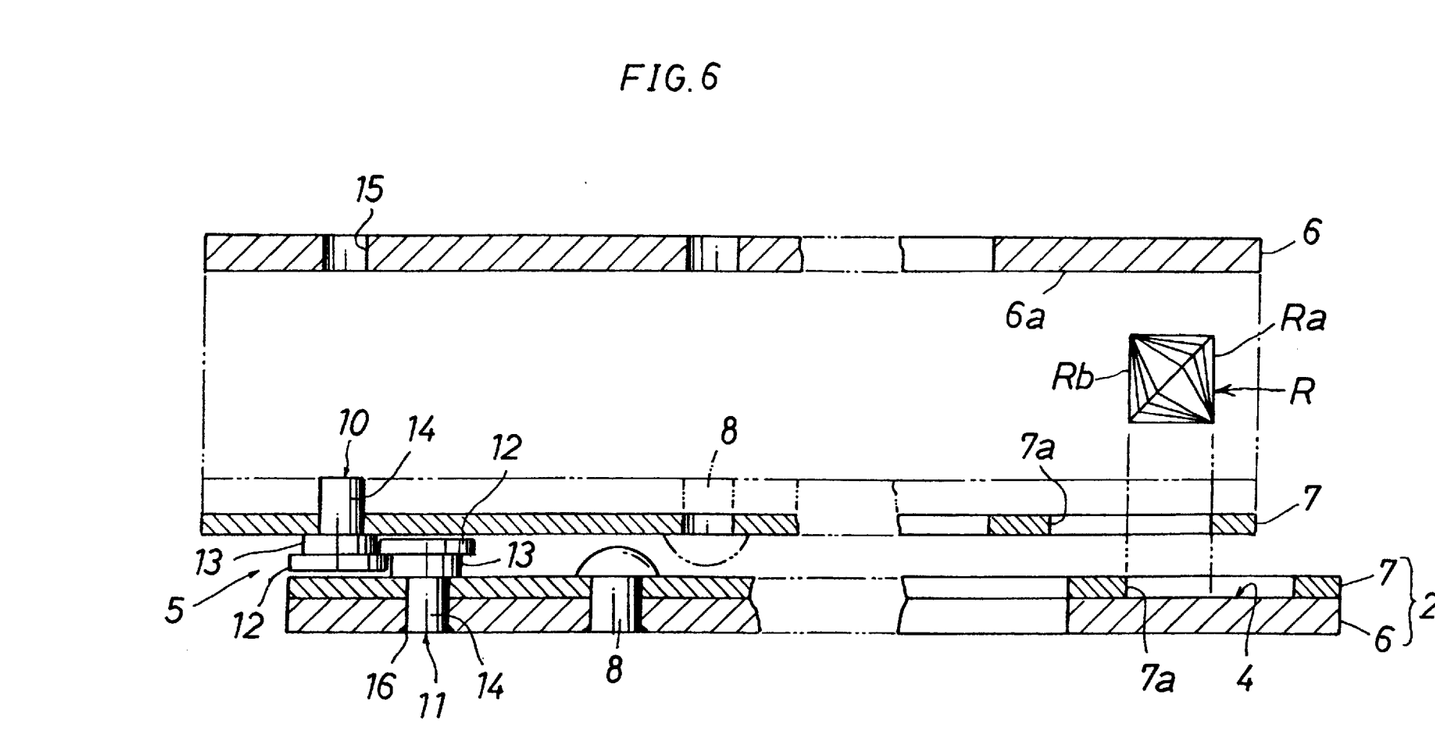
FIG. 6 is a sectional view for explaining the assembling procedure of said roller bearing, showing, with partial omission, the state of work for loading double-cone rollers.
Figure 7:
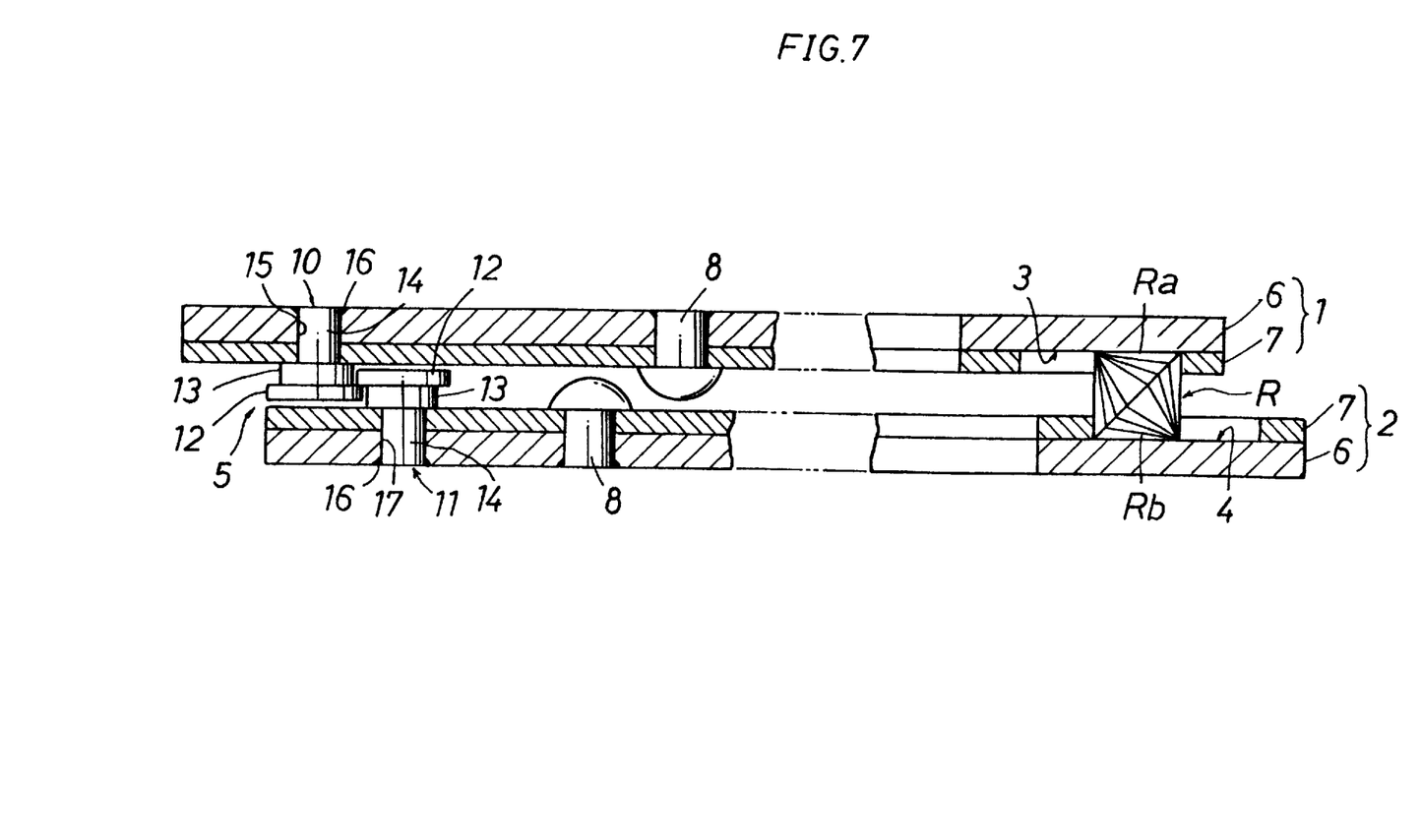
FIG. 7 is a sectional view corresponding to FIG. 6 for also explaining the assembling procedure of said roller bearing, showing the complete state in which the upper and lower bearing plates are regularly connected and held.

Said connecting mechanism 5 is designed to connect and hold said pair of bearing plates 1, 2 in a relatively swivelable state, in the state where the double-cone rollers (R), (R), . . . are interposed between those two bearing plates 1, 2. This connecting mechanism 5 takes, to be concrete, the form of a pair of connecting pins 10, 11 fixed to said two bearing plates 1, 2 respectively, as shown in FIG. 5 to FIG. 7.

Those connecting pins 10, 11 are constructed in exactly the same way. For example, one connecting pin 10 is composed of a material having high-rigidity such as stainless steel, etc. and has an engaging flange 12, a swivelling shaft portion 13 and a mounting shaft portion 14 integrally formed in coaxial shape.

Said engaging flange 12 is in the shape of a large-diameter disc provided at the tip of said connecting pin 10. The cylindrical outer circumferential face of the engaging flange 12 is realized as an engaging face. Said swivelling shaft portion 13 is provided adjacent to the base end in axial direction of said engaging flange 12. This swivelling shaft portion 13 is provided with a cylindrical outer circumferential face of smaller diameter compared with said engaging flange 12, and this outer circumferential face is made to be an engaging face. Moreover said mounting shaft portion 14 is provided at the base end of said connecting pin 10. The mounting shaft portion 14 has an outside diameter and a length sufficient for passing through the through hole 15 in said bearing plate 1.

And, as this mounting shaft portion 14 passes through said through hole 15 from inside, the border steps of the mounting shaft portion 14 and the swivelling shaft portion 13 are engaged in contact to the inner side face of the bearing plate 1, while the outer end of the mounting shaft portion 14 is fastened by caulking from the outside of the bearing plate 1, and thereby said connecting pin 10 is mounted and fastened in upright position to the inside of the bearing plate 1.

The other connecting pin 11 also has same construction as the connecting pin 10 as mentioned above. The mounting shaft portion 14 of this connecting pin 11 is pierced from inside by the through hole 17 of the bearing plate 2, and its outer end is fixed by caulking 16 from the outside of the bearing plate 2, and thereby said connecting pin 11 is mounted and fastened in upright position to the inside of the bearing plate 2.

Those connecting pins 10, 11 also have a function of laminally and integrally fastening said track plate 6 and holding plate 7, thereby providing a structure fit for automatic assembling enabling mass production.

Moreover, the relative construction of said two connecting pins 10, 11, namely the outside diameters of said engaging flange 12 and swivelling shaft portion 13 and the arrangement construction of said through holes 15, 17 through which to let pass and hold the mounting shaft portion 14 are set in a way to satisfy the following conditions:

Namely, as shown in FIG. 5, the engaging flanges 12, 12 of said two connecting pins 10, 11 are set in a way to be engaged in axial direction of the connecting pins 10, 11. And the outer circumferential engaging faces of those engaging flanges 12, 12 are set in a way to be contacted slidably with relatively swivelable against the outer circumferential engaging faces of the shaft portion 13 of either the connecting pin 10 or 11 on the opposite side, at the same locus as the swivelling circle of the double-cone rollers (R).

In this way, the two bearing plates 1, 2 are held, by said connecting pins 10, 11, in a way protected against separation to axial direction and, by the swivelling and rotation of the double-cone rollers (R), relatively swivelable at the same locus as their swivelling circle. A certain small clearance is formed between the respective engaging parts of said two connecting pins 10, 11. The dimension of this small clearance is set as required in according to the shape and dimensions of the double-cone rollers (R).

And, in a roller bearing constructed as described above, the two conical faces (Ra), (Rb) of the double-cone roller (R) roll, in the respective track pockets 3, 4 of a pair of bearing plates 1, 2 while being guided respectively on the inner circumferential face of the track pockets 3, 4, on their track face or bottom face. This guarantees relative and smooth swivelling (see swivelling route (o) in FIG. 1) of the two bearing plates 1, 2 and prevents relative rotation of the two bearing plates 1, 2.

In other words, the double-cone roller (R) roll on said track face and, as shown in FIG. 8 (b), make swivelling motions around the peak point of said two conical faces (Ra), (Rb). Moreover, at the time of this swivelling motion, since said track pockets 3, 4 are disposed with a phase eccentric by an amount of the length of bus bar of the conical faces (Ra), (Rb) of said double-cone roller (R), the rolling motion of the double-cone roller (R) is guided in a state restricted or controlled by the internal circumferential face of said track pockets 3, 4, thus maintaining said double-cone roller (R) in correct position. As a result, the bearing plate 1 on one side makes swivelling motions in the state eccentric by an amount of the length of bus bar of the conical faces (Ra), (Rb) of the double-cone rollers (R), without relatively rotating against the other bearing plate 2 (see arrow mark (o) in FIG. 1).

In addition, said double-cone roller (R) roll on the track face without involving any slide at all, while maintaining a state of correct line contact between said bearing plates 1, 2 swivelling eccentrically. For that reason, in said roller bearing, an ideal and perfect rolling contact state as rolling bearing is obtained, providing a remarkably higher rigidity and a longer service life compared with conventional roller bearing or thrust force supporting structure using spherical bodies such as steel balls, etc.

Moreover, said two bearing plates 1, 2 are realized in a unit structure connected and held by the connecting pins 10, 11 in a state relatively swivelable. For that reason, the double-cone rollers (R), (R), . . . held by the track pockets 3, 4 of those two bearing plates 1, 2 and the track pockets 3, 4, . . . are maintained constantly in a stable state without being disturbed in their arrangement and posture under all kinds of environments including those producing vibrations, etc. This makes it possible for said bearing plates 1, 2 to make their rolling motion always smoothly, and it also becomes possible to secure the ease of transportation and handling of simple bearings and their incorporation in the swivelling unit of equipment.

Furthermore, for the purpose of securing the ease of incorporation in the swivelling unit of equipment, said bearing plates 1, 2 are provided respectively with a positioning means to be engaged with the positioning means on either the fixed side or swivelling side of the swivelling unit of equipment in which they are to be incorporated.

In the illustrated embodiment, as positioning means of said bearing plates 1, 2, positioning holes 20, 21 are pierced respectively, as shown in FIG. 1. Those positioning holes 20, 21 are constructed, though not illustrated, in a way to be inserted in and engaged with the positioning pins provided in swivelling unit of equipment in which they are to be incorporated, in the scroll swivelling unit in a scroll type compressor for example.

For that purpose, said positioning holes 20, 21 are in pairs respectively in opposite positions on a diametrical line of said bearing plates 1, 2. Moreover, the arrangement construction of the positioning holes 20, 21 is set in correspondence to the positioning pins of the swivelling unit of equipment in which they are to be incorporated.

Namely, those positioning holes 20, 21 are provided in such a way that, in the state where those positioning holes 20, 21 are engaged by insertion with said positioning pins of the swivelling unit of equipment, said arrangement construction of roller bearing is secured, thereby securing relative and smooth swivelling motions of said bearing plates 1, 2.

And, in the state where the roller bearing is thus incorporated in said swivelling unit of equipment, the swivelling route of the swivelling unit of equipment and the swivelling route of the bearing plates 1, 2 namely of roller bearing perfectly agree with each other. This makes it possible for the double-cone rollers (R), (R), . . . to make said rolling motions smoothly and stably at all times according to the swivelling motions of the swivelling unit of equipment, thus preventing production of any unusual load due to disagreement of said two swivelling routes. As a result, the bearing plate 2 on the swivelling side smoothly swivels, following the swivelling motions of said swivelling unit of equipment without producing any displacement against the bearing plate 1 on stationary side, nor do said connecting pins 10, 11 put any obstacle to this swivelling motion.

Next, explanation will be given on the assembling method of the roller bearing constructed as described above (refer to FIG. 6 and FIG. 7).

(i) First, the bearing plate 2 on the lower side is assembled. In the state where said track plate 6 and the holding plate 7 are placed one upon another, those plates 6, 7 are integrally laminated and fastened by caulking in the form of pinching by said rivets 8, 8, . . . to complete the bearing plate 2 on the lower side.

(ii) To this bearing plate 2 on the lower side, the holding plate 7 which is the component member of the bearing plate 1 on the upper side is held in the state of provisional connection, by means of said connecting mechanism 5.

To be concrete, first the connecting pin 11 on one side of said connecting mechanism 5 is attached in upright position and fixed on the inner side of said bearing plate 2 on the lower side, namely on the upper side in the drawing, by the procedure described earlier. Namely, the mounting shaft portion 14 of said connecting pin 11 is made to pass through said through hole 17 from inside or from the upper side, to make the border steps of this mounting shaft portion 14 and the swivelling shaft portion 13 engage in contact with the inner side face of the bearing plate 2 and, in this engaged state, the outer end of said mounting shaft portion 14 is fixed by caulking 16 from the outer side or from the lower side of the bearing plate 2.

Next, the other connecting pin 10 is provisionally fixed to the upper bearing plate 1 while being engaged with said connecting pin 11. Namely, the engaging flange 12 of said connecting pin 10 is slidably contacted to the outer circumferential engaging face of the swivelling shaft portion 13 of the connecting pin 11 in a way to be relatively swivelable against the latter and, in this state, the mounting shaft portion 14 is made to pass through the through hole of said holding plate 7 from inside, and its outer end is provisionally fastened to the outside of said holding plate by some proper tacking jig (not illustrated).

This makes it possible to hold the holding plate 7 of the upper bearing plate 1 to the lower bearing plate 2, in a state relatively swivelable against the latter (refer to FIG. 6). In this state of provisional connection, the pocket forming hole or track pocket 4 of the lower bearing plate 7 and the pocket forming hole 7a in said holding plate are positioned in a state mutually eccentric, seen in plane as shown in FIG. 1, by the amount of the radius of swivelling circle of the double-cone roller (R), and those inner circumferential faces form holding hole of about oval shape respectively.

(iii) In the state of provisional connection in which said two connecting pins 10, 11 are mutually engaged, the respective double-cone rollers (R), (R), . . . are inserted in all holding holes (12 holes in the illustrated case), aligned in one same direction, from the holding plate side or upper side. Simultaneously as their insertion, the double-cone rollers (R), (R), . . . are positioned and supported by the inner circumferential face of said holding holes and, as a result, all the double-cone rollers (R), (R), . . . come to disposed in one same direction in one same posture.

(iv) After the loading of said double-cone rollers (R), (R), . . . is completed, both the upper and the lower bearing plates 1, 2 are held in the state of regular connection while completing the upper bearing plate 1, to complete the roller bearing as product.

To be concrete, in the state where the track plate 6 is placed on said holding plate 7, those plates 6, 7 are integrally laminated and fastened by caulking in the form of pinching by rivets 8, 8, to complete the upper bearing plate 1. At the same time or immediately after that, the outer end part or the upper end part of the mounting shaft portion 14 of said connecting pin 10 which was in the state of provisional connection is fixed by caulking 16 from the outer side or upper side of said upper bearing plate 1, to complete the roller bearing.

Moreover, to assemble the roller bearing thus completed in the scroll swivelling unit of a scroll type compressor, for example, while the positioning holes 20, 21 of said bearing plates 1, 2 are inserted and engaged respectively on the positioning pins of the scroll swivelling unit, one of the pair of bearing plates 1, 2, bearing plate 2 for example, is mounted and fastened on the stationary side of said scroll swivelling unit and the other bearing plate 1 is mounted and fastened on the swivelling side of the scroll swivelling unit, to complete the assembling of the roller bearing.

In the roller bearing assembling method as described above, since the double-cone rollers (R), (R), . . . are loaded in the state where the holding plate 7 of the upper bearing plate 1 is held in the state of provisional connection against the lower bearing plate 2, the double-cone rollers (R) can be loaded in the track pockets 3, 4 easily and accurately without being disturbed in their arrangement and posture nor influenced by the working environments such as production of vibrations, etc. For that reason, this method is also fit for automation or mass production by automatic assembling equipment, etc.

Furthermore, since said bearing plates 1, 2 are provided with positioning holes 20, 21 to be engaged with the positioning pins on the fixed side or swivelling side of the swivelling unit of equipment in which they are to be incorporated, the incorporation in the swivelling unit of equipment becomes easier and more accurate combined with said ease of handling.

The embodiment described above simply indicates a suitable mode of operation of the present invention, and the present invention is not limited to such example but can be changed into a variety of designs in the range of its ideas.

(1) In the illustrated embodiment, the assembled structure of bearing plates 1, 2 is fixed by rivet 8 at 3 points set at equal intervals in the circumferential direction on the track plate 6 and the holding plate 7, but the number of such fastening points and their arrangement may be set as properly depending on the shape and dimensions of the two plates 6, 7.

Moreover, the concrete fastening method of the two plates 6, 7 is not limited to fixing by rivet as indicated in the illustration if only it is fit for automatic assembling.

(2) The concrete shape and dimensions of double-cone roller (R) such as apex angle of conical faces (Ra), (Rb), etc. may be modified in design as required, considering swivelling route of the swivelling unit of equipment in which the roller bearing is to be incorporated, such as the scroll swivelling unit in a scroll type compressor, for example, and also considering relationship between the swivelling radius of said two conical faces (Ra), (Rb) and the diameter of the double-cone roller (R).

As an example, while the illustrated embodiment has a sectional shape of rectangular equilateral triangle with an apex angle of 90°, it is also possible to adopt double-cone rollers of a variety of shapes and dimensions as disclosed in the Japanese Laid-open Patent No. 62-274113, for example.

Furthermore, while the illustrated double-cone roller (R) is realized in a geometrically complete double-cone shape consisting of a pair of cones only, the present invention is not limited to such shape. For example, their conical faces (Ra), (Rb) may be provided with crowning or have anything that substantially has a shape of double cone such as slight cylindrical part, etc. interposed at the joint between the pair of cones i.e. at the joint part between the bottoms of the cones or roundness at the top of the upper and lower cones as required, for the prevention of edge load.

(3) In the illustrated embodiment, a pair of connecting pins 10, 11 are provided at 3 points at equal intervals in the circumferential direction also considering the relative positional relation with the arrangement of rivets 8, but this number of fixing points may be set as required depending on the shape and dimensions of the plates 6, 7 and its fixing method is not limited to fixing by caulking 16 as illustrated, if only it is fit for automatic assembling.

(4) While the positioning means for securing the ease of incorporation in the swivelling unit of equipment takes the form of positioning holes 20, 21 in the illustrated embodiment, the concrete form is something to be determined in correspondence to the shape of the positioning unit of the swivelling unit of equipment which is the mating part, and can be changed to a construction opposite to that of the illustrated embodiment or to some other form having similar functions.

As described in detail so far, in the roller bearing according to the present invention, realized in such a way that a plural number of track pockets are provided in a pair of parallel bearing plates in a way to face each other, and double-cone rollers are swivelably and rollably held respectively in this pair of track pockets, said pair of bearing plates are connected and held in a relatively swivelable state by connecting means and the double-cone rollers perform rolling motions in the track pockets of said two bearing plates, to not only guarantee relative and smooth swivelling of the two bearing plates but also prevent relative rotation of the two bearing plates.

Moreover, since said pair of swivelling means are realized in a unit structure connected and maintained, by connecting means, in a relatively swivelable state, the double-cone rollers held in the track pockets of those two bearing plates are not disturbed in arrangement and posture under any environments due to vibrations, etc. and their state of holding is constantly maintained stable. Therefore, said rolling motions of double-cone rollers can be made smoothly at all times, and it becomes possible to perform transportation and handling in the form of simple bearings or incorporation in the swivelling unit of equipment such as scroll swivelling unit in a scroll type compressor, etc.

Furthermore, in the case where said bearing plates are provided respectively with positioning parts to be engaged with the positioning parts on the fixed side or swivelling side of the swivelling unit of equipment in which they are to be incorporated, the incorporation in the swivelling unit of equipment becomes easier and more accurate combined with said ease of handling in the form of simple bearings, also effectively preventing production of any unusual load without displacement of the two bearing plates during said swivelling operation.

Still more, in the roller bearing assembling method as according to the present invention, since the double-cone rollers are loaded in the state where a holding plate having pocket forming holes is provisionally connected in the state relatively swivelable against the bearing plate on one side, the incorporation of the double-cone rollers in the track pockets can be made easily and accurately without being influenced by the working environments such as production of vibrations, etc. nor disturbed in their arrangement and posture, this method is also fit for mass production by automatic assembling equipment, etc. The present invention can therefore provide a roller bearing having a structure which is by far less costly and highly accurate compared with conventional roller bearing of similar type.

Especially, in view of the fact that development of scroll type compressor is actively promoted in recent years as product adapted to switching of refrigerant from conventional freon gases to propane gas, etc. in an effort for improving the earth environments, the roller bearing according to the present invention, having excellent durability and sufficiently resistant to long period of use under high-speed and high-load conditions, is most suitable as thrust force supporting structure in the scroll swivelling unit in this type of compressor. This enabled, therefore, putting to practical use and mass production of thrust bearing of thrust force supporting structure provided with double-cone rollers the development of which had been delayed in the past, as well as scroll type compressor provided with this supporting structure.

The concrete embodiment presented in the detailed description of the invention above is essentially intended to clarify the contents of technology of the present invention and, therefore, the present invention shall not be interpreted in a narrow sense limited to the concrete example described above but shall be interpreted in a broad sense as being available for execution in a variety of ways in the spirit and the range described in the Claims of the present invention.

What is claimed is:

1. A roller bearing having double-cone rollers as rolling elements, comprising
    a pair of bearing swivelling means available for incorporation in the fixed side part and the swivelling side part respectively of a swivelling unit of equipment,
    a plural number of track pockets provided in a way to face the pair of bearing swivelling means respectively,
    double-cone rollers bearing the thrust load by being swivelably and rollably held in this opposing pair of track pockets, and
    a connecting means for connecting and holding said pair of bearing swivelling means in a relatively swivelable state,
    thereby constructing said pair of bearing swivelling means in a way to be disposed in a state parallel to each other and perform relative swivelling motions.

2. A roller bearing having double-cone rollers as rolling elements, comprising
    a pair of bearing plates available for incorporation in the fixed side part and the swivelling side part respectively of a swivelling unit of equipment,
    a plural number of track pockets provided in a way to face this pair of bearing plates respectively,
    double-cone rollers for bearing the thrust load by being swivelably and rollably held in this opposing pair of track pockets, and
    a connecting mechanism for connecting and holding said pair of bearing plates in a relatively swivelable state,
    thereby constructing said pair of bearing plates in a way to be disposed in a state parallel to each other and perform relative swivelling motions.

3. A roller bearing as defined in claim 2, wherein said connecting mechanism takes the form of a pair of connecting pins fixed to said two bearing plates respectively, and
    the connecting pin provided on the bearing plate on one side and the connecting pin provided on the bearing plate on the other side are engaged in a way relatively swivelable at the same locus as the swivelling circle of said double-cone rollers.

4. A roller bearing as defined in claim 3, wherein said connecting pin has an engaging flange at the tip, and a swivelling shaft portion on the base end side in axial direction of this engaging flange, and the engaging flange of said two bearing plates are slidably contacted to the outer circumferential engaging face of the swivelling shaft portion of the connecting pin in the bearing plate on the partner side in a way to be relatively swivelable against the latter, and said two bearing plates are thereby held in a state relatively swivelable at the same locus as the swivelling circle of said double-cone rollers.

5. A roller bearing as defined in claim 4, wherein said connecting pin has its base end portion realized as a mounting shaft portion integrally formed in coaxial shape with said swivelling shaft portion and engaging flange, and this mounting shaft is made to pass through the through hole of said bearing plate from inside, while the outer end thereof is fastened by caulking from the outside of the bearing plate.

6. A roller bearing as defined in claim 2, wherein said bearing plates are formed by integrally laminating and fastening a track plate having a track forming face and a holding plate having pocket forming holes, said track pockets being formed by said track forming face and pocket forming holes, and the double-cone rollers held in a pair of track pockets facing each other in said pair of bearing plates are realized in such a way that the conical face on one side is made rollable on the track face of said track pocket on one side, while the other conical face is made rollable on the track face of said track pocket on the other side.

7. A roller bearing as defined in claim 6, wherein said track plate and holding plate are integrally laminated and fastened by a plural number of rivets connecting them in the form of pinching.

8. A roller bearing as defined in claim 2, wherein said track pockets have an inner circumferential face of the same diameter as the swivelling circle of said double-cone rollers, and the inner circumferential face of said pair of track pockets opposing each other are disposed in a state mutually eccentric, as seen in plane, by the amount of the radius of swivelling circle of said double-cone rollers, said double-cone rollers being guided and held in the holding hole of about oval shape formed by lapping those two inner circumferential faces.

9. A roller bearing as defined in claim 2, wherein said pair of bearing plates are provided respectively with a positioning means to be engaged with the positioning means on either the fixed side or swivelling side of the swivelling unit of equipment in which they are to be incorporated, and the engagement of those two positioning means makes the swivelling route of said pair of bearing plates and the swivelling route of said swivelling unit of equipment perfectly agree with each other.

10. A roller bearing as defined in claim 9, wherein said positioning means takes the form of positioning hole or positioning pin provided in correspondence to either positioning pin or positioning hole provided on either the fixed side or the swivelling side of the swivelling unit of equipment in which to incorporate said pair of bearing plates, and the positioning pin or positioning hole of said bearing plates the positioning hole or positioning pin of said swivelling unit of equipment are engaged by insertion, at the time of incorporation of said bearing plates in said swivelling unit of equipment.

11. A roller bearing as defined in claim 2, wherein the roller bearing is of unit structure used as thrust force supporting structure of the scroll swivelling unit in a scroll type compressor, said pair of bearing plates take the form of circular disc having an inside diameter allowing insertion of the shaft part of said scroll swivelling unit, and at the central portion in radial direction of this pair of bearing plates, said track pockets are provided facing each other and at equal intervals in the circumferential direction.

12. A method of assembling a roller bearing which includes a plural number of double-cone rollers swivelably and rollably interposed between a pair of parallel bearing plates, said method comprising:

(a) forming one bearing plate by integrally laminating and fastening a track plate having track forming face and a first holding plate having plural holes;

(b) provisionally connecting and holding, by a connecting mechanism, a second holding plate having plural pocket forming holes in a state relatively swivelable against said one bearing plate and positioning said one bearing plate and said first holding plate in a state where the pocket forming holes in said one bearing plate and the pocket forming holes in said second holding plate are mutually eccentric, as seen in plane, by the amount of the radius of a swivelling circle of said double-cone rollers;

(c) inserting and disposing the respective double-cone rollers, aligned in one same direction, form said second holding plate side in a plural number of holding holes, each holding hole having an about oval shape formed by the overlap of the two inner circumferential faces of the pocket forming holes of said first and second holding plates;

(d) forming the other bearing plate of the pair of parallel bearing plates by integrally laminating and fastening a track plate having track forming face to said second holding plate, and regularly connecting and holding, by said connecting mechanism, said other plate and said one bearing plate in a relatively swivelable state.

13. A method of assembling a roller bearing as defined in claim 12, wherein said connecting mechanism takes the form of a pair of connecting pins fixed to said two bearing plates respectively, this connecting pin comprises an engaging flange at the tip, a swivelling shaft portion on the base end side in axial direction of this engaging flange and a mounting shaft portion at the base end, said provisional connection and holding by said two connecting pins consists in making the mounting shaft portion on one side pass from inside into the through hole in said bearing plate, fixing its outer end by caulking from the outside of the bearing plate, slidably contacting the engaging flange of the other contacting pin in a way to be relatively swivelable against the outer circumferential face of the swivelling shaft portion of said connecting pin on one side and, in that state, making its mounting shaft portion pass from inside through the through hole in said holding plate and provisionally fasting its outer end at the outside of the holding plate, said regular connection and holding by said two connecting pins consists in forming the bearing plate on the other side by integrally laminating and fixing the track plate having track forming face to said holding plate, and then caulking and fixing the outer end part of the mounting shaft portion of said other connecting pin which had been provisionally fastened from the outside of the other bearing plate, and in the state of such provisional connection and holding or regular connection and holding, the engaging flange of said two bearing plates are slidably contacted to the outer circumferential engaging face of the swivelling shaft portion of the connecting pin in the bearing plate on the partner side in a way to be relatively swivelable against the latter, and said two bearing plates are thereby held in a state relatively swivelable at the same locus as the swivelling circle of said double-cone roller.

* * * * *